(12) United States Patent
Wong et al.

(10) Patent No.: US 11,775,717 B2
(45) Date of Patent: Oct. 3, 2023

(54) CHIP DESIGN METHOD, CHIP DESIGN DEVICE, CHIP, AND ELECTRONIC DEVICE

(71) Applicant: CHENGDU HAIGUANG INTEGRATED CIRCUIT DESIGN CO., LTD., Sichuan (CN)

(72) Inventors: Yuqian Cedric Wong, Austin, TX (US); Shuiyin Yao, Beijing (CN); Hongchang Liang, Austin, TX (US); Zhimin Tang, Beijing (CN)

(73) Assignee: CHENGDU HAIGUANG INTEGRATED CIRCUIT DESIGN CO., LTD., Sichuan (CN)

(*) Notice: Subject to any disclaimer, the term of this patent is extended or adjusted under 35 U.S.C. 154(b) by 306 days.

(21) Appl. No.: 17/254,242

(22) PCT Filed: Dec. 30, 2019

(86) PCT No.: PCT/CN2019/129895
§ 371 (c)(1),
(2) Date: Dec. 18, 2020

(87) PCT Pub. No.: WO2021/134200
PCT Pub. Date: Jul. 8, 2021

(65) Prior Publication Data
US 2022/0222407 A1 Jul. 14, 2022

(51) Int. Cl.
*G06F 30/3312* (2020.01)
*G06F 30/327* (2020.01)
(Continued)

(52) U.S. Cl.
CPC ........ *G06F 30/3312* (2020.01); *G06F 30/327* (2020.01); *G06F 2119/06* (2020.01); *G06F 2119/12* (2020.01)

(58) Field of Classification Search
USPC ........................................................ 716/113
See application file for complete search history.

(56) References Cited

U.S. PATENT DOCUMENTS

| 9,275,178 B1 * | 3/2016 | Fung ............... G06F 30/3312 |
| 2007/0044052 A1 * | 2/2007 | Park .................. G06F 30/33 716/109 |

(Continued)

FOREIGN PATENT DOCUMENTS

| CN | 101251870 A | 8/2008 |
| CN | 102545574 A | 7/2012 |

(Continued)

OTHER PUBLICATIONS

China National Intellectual Property Administration, International Search Report and Written Opinion, dated Sep. 30, 2020, 11 pages.

(Continued)

*Primary Examiner* — Mohammed Alam
(74) *Attorney, Agent, or Firm* — Loeb & Loeb LLP

(57) ABSTRACT

A chip design method, a chip design device, a chip, and an electronic device are provided. The chip design method includes: determining at least one power state of the chip, one power state of the at least one power state including switch states of respective power domains on the chip in a chip operation mode, and the at least one power state including a first power state; determining control signals sent by changed power domains in the respective power domains in a case where a power state of the chip is switched to the first power state, in a case where the power state of the chip is switched to the first power state, switch states of the changed power domains changing; and analyzing timing dependency between the control signals to determine timing dependency between power domains to which the control signals act in the first power state.

14 Claims, 6 Drawing Sheets

(51) Int. Cl.
*G06F 119/06* (2020.01)
*G06F 119/12* (2020.01)

(56) References Cited

U.S. PATENT DOCUMENTS

| | | | | |
|---|---|---|---|---|
| 2008/0127014 A1* | 5/2008 | Pandey | ............ | G06F 30/30 |
| | | | | 716/109 |
| 2008/0222436 A1* | 9/2008 | Matsui | ............ | G06F 1/32 |
| | | | | 713/320 |
| 2009/0259982 A1* | 10/2009 | Verbeure | ............ | G06F 30/327 |
| | | | | 716/129 |
| 2010/0281444 A1* | 11/2010 | Zejda | ............ | G06F 30/18 |
| | | | | 716/113 |
| 2012/0054511 A1* | 3/2012 | Brinks | ............ | G06F 1/3243 |
| | | | | 713/310 |
| 2022/0222407 A1* | 7/2022 | Wong | ............ | G06F 1/26 |

FOREIGN PATENT DOCUMENTS

| | | |
|---|---|---|
| CN | 102694542 A | 9/2012 |
| CN | 104156049 A | 11/2014 |
| CN | 107862155 A | 3/2018 |
| CN | 109617544 A | 4/2019 |

OTHER PUBLICATIONS

Chinese Office Action for corresponding Chinese Application No. 201980006491.1, dated Sep. 15, 2022, 18 pages.

* cited by examiner

| | PDA | PDB | PDC |
|---|---|---|---|
| power off | on | off | off |
| standby | on | off | off |
| sleep | on | on | off |
| ... | ... | ... | ... |

CHIP DESIGN METHOD, CHIP DESIGN DEVICE, CHIP, AND ELECTRONIC DEVICE

CROSS-REFERENCE TO RELATED APPLICATION

This application is an US National Phase application claiming priority to the PCT International Application PCT/CN2019/129895, filed on Dec. 30, 2019. For all purposes, the entire disclosure of the aforementioned application is incorporated by reference as part of the disclosure of this application.

TECHNICAL FIELD

The embodiments of the present disclosure relate to a field of chip technology, and in particular, to a chip design method, a chip design device, a chip, and an electronic device.

BACKGROUND

Electronic Design Automation (EDA) is a common technology for chip design; and EDA takes a computer as a tool to complete design files according to hardware description languages (e.g., Verilog and VHDL, etc.), and then the computer automatically completes logic compilation, simplification, segmentation, synthesis, optimization, layout, routing, and simulation, until works such as adaptive compilation, logic mapping, and programming download for a specific target chip are fulfilled. The EDA technology can greatly improve efficiency of chip design and reduce labor intensity of designers.

SUMMARY

Embodiments of the present disclosure provide a chip design method, a chip design device, a chip, and an electronic device; the method may be used for determining timing dependency between power domains in a register transfer level (RTL) verification stage of the chip, thereby ensuring stability of a circuit when the power domains are switched off.

An embodiment of the present disclosure provides a chip design method, which is applicable to a register transfer level (RTL) verification stage of a chip, the chip design method comprises: determining at least one power state of the chip, in which one power state of the at least one power state comprises switch states of respective power domains on the chip in a chip operation mode, and the at least one power state comprises a first power state; determining control signals sent by changed power domains in the respective power domains in a case where a power state of the chip is switched to the first power state, in which in a case where the power state of the chip is switched to the first power state, switch states of the changed power domains change; and analyzing timing dependency between the control signals to determine timing dependency between power domains to which the control signals act in the first power state.

Optionally, determining the at least one power state of the chip comprises: analyzing a power state table of a united power format file to determine the at least one power state of the chip, the power state table describes the switch states of the respective power domains on the chip in each chip operation mode.

Optionally, analyzing the timing dependency between the control signals to determine the timing dependency between power domains to which the control signals act in the first power state comprises: determining power sources corresponding to the control signals; determining a power supply relationship of the power sources according to characteristics of the power sources, in which the power supply relationship comprises: power domains powered by the power sources, and a connection mode of domain crossing lines of the power domains powered by the power sources; determining, according to the power supply relationship of the power sources, whether the domain crossing lines of the power domains powered by the power sources are affected by switch states of the power sources; and determining that power domains connected with a domain crossing line affected by the switch states of the power sources has timing dependency in the first power state.

Optionally, the chip design method further comprises: determining that power domains connected with a domain crossing line not affected by the switch states of the power sources does not have timing dependency in the first power state.

Optionally, determining the power sources corresponding to the control signals comprises: determining the domain crossing lines corresponding to the control signals; determining power control lines corresponding to the domain crossing lines; and backtracking the power sources corresponding to the power control lines through the power control lines.

Optionally, determining the power control lines corresponding to the domain crossing lines comprises: determining the power control lines corresponding to the domain crossing lines according to the power state table and mode information of a power management unit; and backtracking the power sources corresponding to the power control lines through the power control lines comprises: determining the power sources corresponding to the power control lines according to the mode information of the power management unit.

Optionally, the chip design method further comprises: determining that a domain crossing line is affected by the switch states of the power sources, and designing an isolation unit in a power domain connected with an output end of the domain crossing line, the isolation unit is configured to isolate a power domain connected with an input end of the domain crossing line from the power domain connected with the output end of the domain crossing line, before the power domain connected with the input end of the domain crossing line is switched off.

Optionally, the at least one power state further comprises a second power state; determining the control signals sent by the changed power domains in the respective power domains in a case where the power state of the chip is switched to the first power state comprises: determining switch states of the respective power domains in the second power state; determining switch states of the respective power domains in the first power state; determining the changed power domains in a case where the power state of the chip is switched from the second power state to the first power state, according to the switch states of the respective power domains in the second power state and the switch states of the respective power domains in the first power state; and determining the control signals sent by the changed power domains.

An embodiment of the present disclosure further provides a chip design device, and the chip design device comprises: a power state determination circuit, configured to determine at least one power state of a chip, in which one power state of the at least one power state comprises switch states of respective power domains on the chip in a chip operation mode, and the at least one power state comprises a first power state; a control signal determination circuit, configured to determine control signals sent by changed power domains in the respective power domains in a case where the power state of the chip is switched to the first power state, in which in a case where the power state of the chip is switched to the first power state, switch states of the changed power domains change; and an analysis circuit, configured to analyze timing dependency between the control signals to determine timing dependency between power domains to which the control signals act in the first power state.

An embodiment of the present disclosure further provides a chip, and the chip comprises: a power management unit, configured to acquire timing dependency between a first power domain and a second power domain; a first power source and a second power source connected with the power management unit; a first power domain connected with the first power source, the first power source supplying power to the first power domain; a second power domain connected with the second power source, the second power source supplying power to the second power domain, the timing dependency indicating that the second power domain depends on the first power domain in timing in a current power state; the second power domain comprises an isolation unit, and the isolation unit is configured to isolate the first power domain from the second power domain before the first power domain is switched off.

Optionally, a first input end of the isolation unit is connected with a control line between the first power domain and the second power domain, and the control line is a domain crossing line that crosses from the first power domain to the second power domain; and a second input end of the isolation unit is connected with the power management unit.

Optionally, the power management unit is configured to: send, based on the timing dependency, an isolation signal to the isolation unit before sending a power down signal to the first power source to switch off the first power domain, so that the isolation unit isolates the control line between the first power domain and the second power domain; and send the power down signal to the first power source after the control line between the first power domain and the second power domain is isolated, to switch off the first power domain.

An embodiment of the present disclosure further provides an electronic device, comprising the chip according to any one embodiment of the above embodiments.

In the embodiments of the present disclosure, at least one power state of the chip may be determined in the RTL verification stage of chip design, one power state of the at least one power source includes switch states of respective power domains on the chip in a chip operation mode, and the at least one power state includes a first power state; control signals sent by changed power domains in the respective power domains in a case where a power state of the chip is switched to the first power state are determined, in a case where the power state of the chip is switched to the first power state, the switch states of the changed power domains change; furthermore, timing dependency between respective control signals are analyzed to determine timing dependency between the respective control signals, and timing dependency between power domains to which the respective control signals act in the first power state is determined according to the timing dependency between the respective control signals, so as to achieve to determine timing dependency between the power domains in respective power states. In the embodiments of the present disclosure, in the RTL verification stage of the chip design, the timing dependency between the control signals sent by the power domains whose switch states change when the power state of the chip is switched may be analyzed, and therefore, in the power state to which the chip is switched, the timing dependency between the power domains is determined, so as to determine the timing dependency between the power domains; in addition, in the embodiment of the present disclosure, the timing dependency between the power domains may be analyzed and determined in the RTL verification stage, instead of being implemented in a gate level stage of the chip design, so that the embodiments of the present disclosure may relatively easily implement analysis and determination of the timing dependency between the power domains.

BRIEF DESCRIPTION OF THE DRAWINGS

In order to explain the technical solutions in the embodiments of the present application or the prior art more clearly, the drawings used in the embodiments or the prior art description will be briefly introduced below. Obviously, the drawings in the following description are only exemplary embodiments of the present disclosure. Based on the described drawings herein, those skilled in the art can obtain other drawing(s), without any inventive work.

DETAILED DESCRIPTION

The technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the disclosure.

With respect to chip design, in addition to considering performance and costs, the chip design also needs to consider chip level or system level power consumption requirements. Therefore, low-power chip design is also a key task for chip design. Current low-power chip design may be implemented by using a design of multiple power domains, by running certain power domains at a lower power source voltage, or shutting down power domains in an idle state, thereby achieving to reduce power consumption of a chip. An inventor of the present disclosure has found that: based on the current low-power chip design, when a power domain needs to be turned off, if timing dependency between power domains is not considered, it is very likely to cause a chip circuit to be unstable; and therefore, how to determine the timing dependency between the power domains becomes very important.

Figure 1:
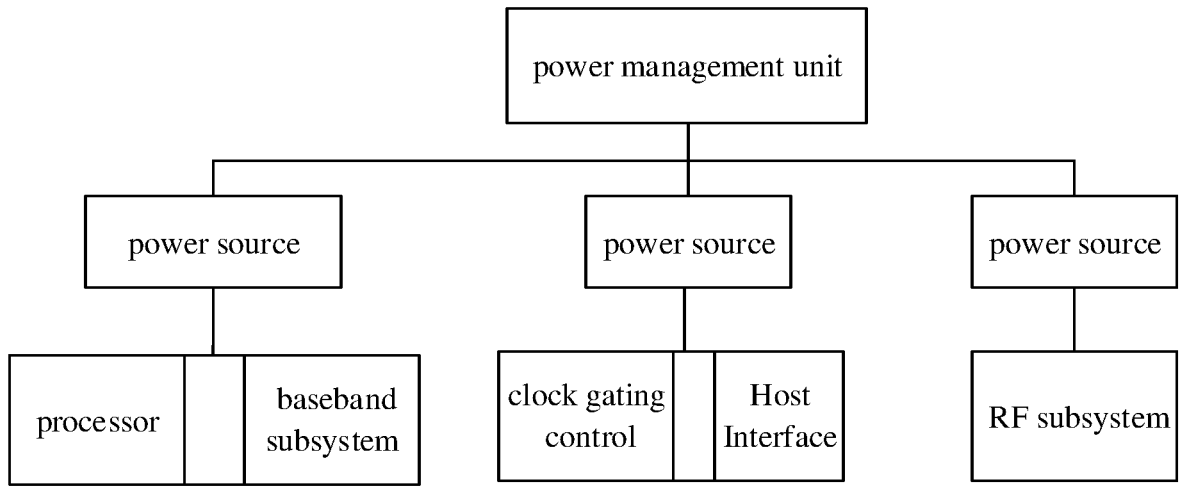
FIG. 1 is a schematic diagram of a power management unit having power domains and managing power sources.

A power domain of a chip may be switched off under control of a power management unit (PMU); as shown in FIG. 1, the PMU may be connected with a power source, the power source may be connected with a power domain, the power domain may refer to a group of design elements that share the power source in the chip; exemplarily, as shown in FIG. 1, the power domain may include, for example: a Host Interface and clock gating control (CGC) module, a processor and baseband subsystem module, and an RF subsystem module. It should be noted that, there may also be connection lines (not shown in FIG. 1) among the power domains; a form of the power domains shown in FIG. 1 is only an optional example, any one of the power domains described below in the embodiments of the present disclosure may be any one of various forms of power domains; and of course, the embodiments of the present disclosure also support that any one of the power domains described below is other forms of power domain, and the power domains are not limited to the above-described examples.

Figure 2:
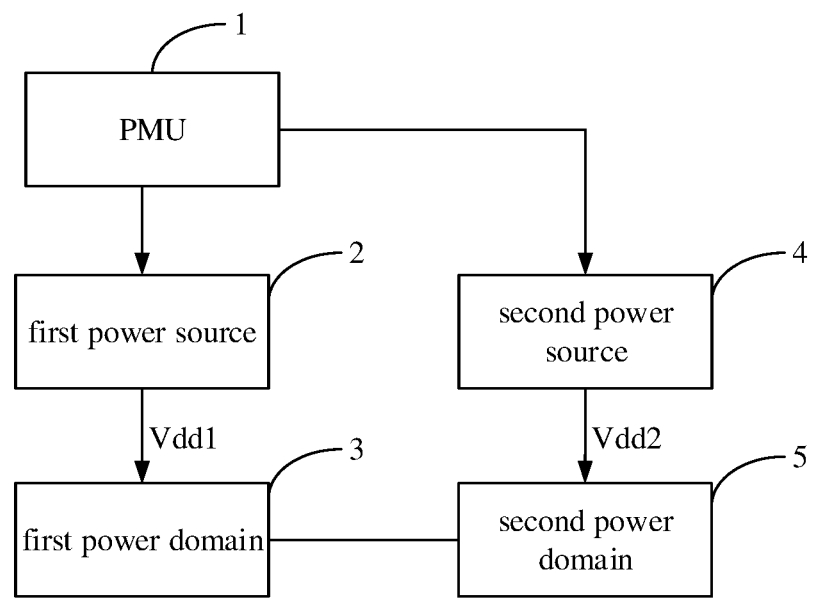
FIG. 2 is a structural schematic diagram of a chip.

Optionally, an example of a chip may be as shown in FIG. 2, and the chip may comprise: a PMU1, a first power source 2, a first power domain 3, a second power source 4, and a second power domain 5; for example, the first power source 2 outputs a voltage Vdd1 to the first power domain 3 so as to supply power to the first power domain 3, the second power source 4 outputs a voltage Vdd2 to the second power domain 5 so as to supply power to the second power domain 5; and powering-up and powering-down of the first power source 2 and the second power source 4 may be controlled by the PMU1.

Figure 3:
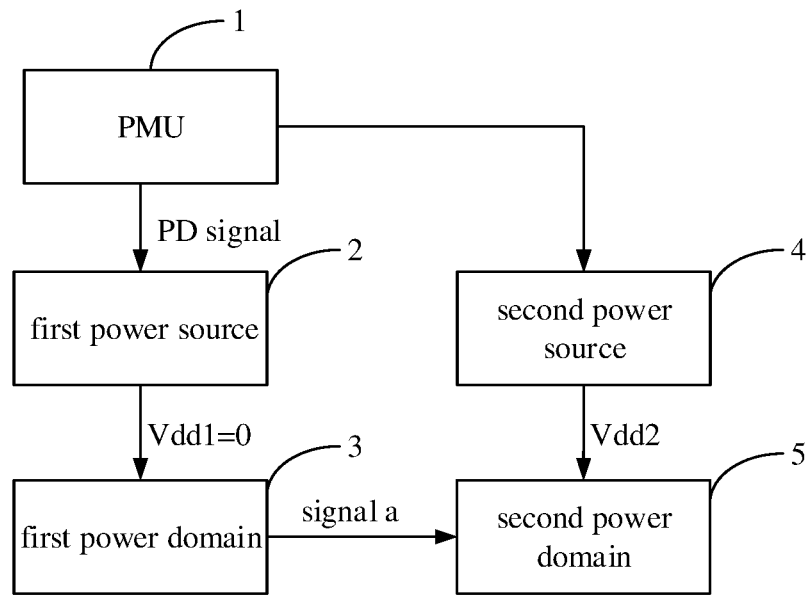
FIG. 3 is a schematic diagram of switching off a first power domain provided by an embodiment of the present disclosure.

Exemplarily, based on the structure of the chip shown in FIG. 2, FIG. 3 shows an optional schematic diagram of switching off the first power domain 3; in a case where the first power domain 3 needs to be switched off, the PMU1 may output a power down (PD) signal to the first power source 2, and the first power source 2 is powered down (accordingly, the voltage Vdd1 output from the first power source 2 to the first power domain 3 becomes 0 volts), so that the first power domain 3 is switched off.

Similarly, in a case where the second power domain 5 needs to be switched off, the PMU1 may output a PD signal to the second power source 4, and the second power source 4 is powered down (accordingly, the voltage Vdd2 output from the second power source 4 to the second power domain 5 becomes 0 volts), so that the second power domain 5 is switched off.

Exemplarily, in a case where the first power domain 3 needs to be switch on, the PMU1 may output a power up signal to the first power source 2, and the first power source 2 is powered up (accordingly, the voltage Vdd1 output from the first power source 2 to the first power domain 3 changes to a positive value), so that the first power domain 3 is switched on; similarly, in a case where the second power domain 5 needs to be switch on, the PMU1 may output a power up signal to the second power source 4, and the second power source 4 is powered up (accordingly, the voltage Vdd2 output from the second power source 4 to the second power domain 5 changes to a positive value), so that the second power domain 5 is switched on.

It can be understood that, the power up signal and the power down signal are power control signals for the PMU1 to control the power sources (e.g., the first power source 2 and the second power source 4 shown in FIG. 2).

Figure 4:
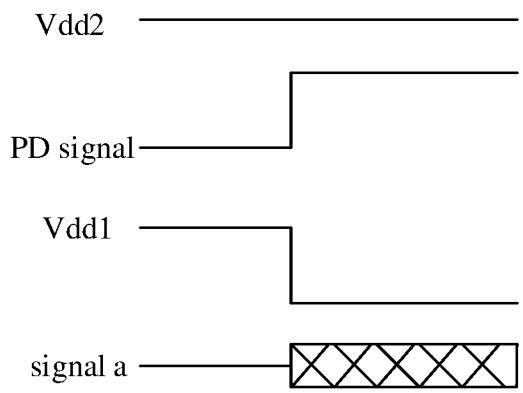
FIG. 4 is a schematic diagram of signals corresponding to switching off a first power domain provided by the embodiment of the present disclosure.

Exemplarily, taking a case that the second power domain 5 depends on the first power domain 3 in timing as an example, and based on the example shown in FIG. 3, FIG. 4 shows a schematic diagram of signal change during a process of switching off the first power domain; it can be seen from FIG. 4 that, if the first power domain 3 is immediately switched off when the PMU1 outputs the PD signal to the first power source 2, then a signal a output from the first power domain 3 to the second power domain 5 will become unknown from a determinable value; because the second power domain 5 depends on the first power domain 3 in timing, the second power domain 5 becomes unstable due to the sudden switch-off of the first power domain 3, resulting in instability of the chip circuit; in FIG. 4, the Vdd2 maintains at a power up state (a positive value), the PD signal being in a low level state indicates that the PD signal is not activated, the PD signal being in a high level state indicates that the PD signal is activated, the Vdd1 being in a low level state indicates that the first power source 2 is powered down, that is, the first power domain 3 is switched off, and the Vdd1 being in a high level state indicates that the first power source 2 is powered up, that is, the first power domain 3 is switched on.

It may be understood that, under control of the PMU1, a power domain (e.g., the first power domain 3 or the second power domain 5 shown in FIG. 2) will change between an on state and an off state; while timing dependency usually exists between a plurality of power domains, and if the timing dependency between the power domains is not considered when the PMU1 switches off the power domains, it is very likely to cause the chip circuit to be unstable.

Figure 5:
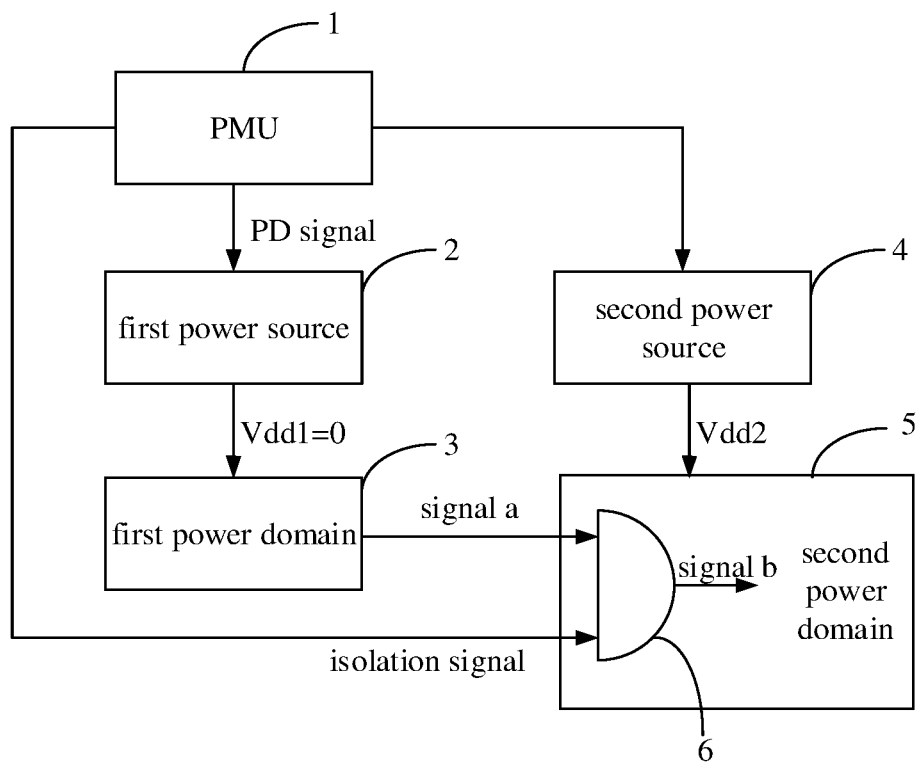
FIG. 5 is a structural schematic diagram of a chip provided by an embodiment of the present disclosure.

On this basis, in order to reduce instability of the chip circuit in a case where the power domains are switched off, an embodiment of the present disclosure provides an improved chip and an adaptive solution for switching off power domains; optionally, the chip provided by the embodiment of the present disclosure may be as shown in FIG. 5; and referring to FIG. 5, the chip may comprise: a PMU1, a first power source 2, a first power domain 3, a second power source 4, a second power domain 5, and an isolation unit 6 disposed in the second power domain 5, the first power source 2 is connected with the first power domain 3, the first power source 2 powers the first power domain 3; the second power source 4 is connected with the second power domain 5, and the second power source 4 powers the second power domain 5. The isolation unit 6 is configured to isolate the first power domain 3 from the second power domain 5 before the first power domain 3 is switched off.

For example, the PMU1 is configured to acquire timing dependency between the first power domain and the second power domain. The timing dependency is determined based on a chip design method to be described below.

The timing dependency indicates that in a current power state, the second power domain 5 depends on the first power domain 3 in timing; and optionally, the isolation unit 6 may be an electric gate (e.g., a logic gate such as a NAND gate).

Optionally, in order to reduce instability of the chip circuit when the first power domain 3 is switched off, before the first power domain 3 is switched off, in the embodiment of the present disclosure, the isolation unit 6 in the second power domain 5 may firstly isolate the first power domain 3 from the second power domain 5, for example, isolate a control line connected between the first power domain 3 and the second power domain 5, and then the first power domain 3 is switched off, so as to reduce instability of the second power domain 5 that depends on the first power domain 3 after the first power domain 3 is switched off, thereby achieving a purpose of reducing instability of the chip circuit when the first power domain 3 is switched off.

For example, a first input end of the isolation unit 6 disposed in the second power domain 5 may be connected with the control line between the first power domain 3 and the second power domain 5, the control line may be a domain crossing line that crosses from the first power domain 3 to the second power domain 5; a second input end of isolation unit 6 is connected with the PMU1, the second input end of isolation unit 6 may detect an isolation signal, that is, receive the isolation signal; an output end of the isolation unit 6 may be connected with the second power domain 5, and the output end of the isolation unit 6 may output a signal b. It may be set in the embodiment of the present disclosure that: the PMU1 may firstly send, based on the timing dependency, the isolation signal to the isolation unit 6 disposed in the second power domain 5 before sending a PD signal to the first power source 2, so that the isolation unit 6 may isolate the control line connected between the first power domain 3 and the second power domain 5 to implement to isolate the first power domain 3 from the second power domain 5, and further, the PMU1 sends a PD signal to the first power source 2 to switch off the first power domain 3.

Figure 6:
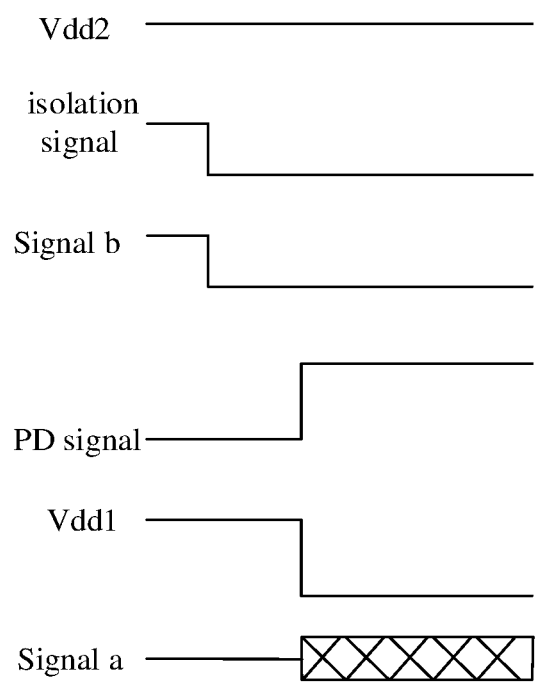
FIG. 6 is another schematic diagram of signals corresponding to switching off a first power domain provided by the embodiment of the present disclosure.

Exemplarily, FIG. 6 shows a schematic diagram of signal change in a process of switching off the first power domain according to the embodiment of the present disclosure; it can be seen that, the isolation signal works prior to the PD signal, that is, the PD signal is activated after the control line connected between the first power domain 3 and the second power domain 5 is isolated firstly; although the signal a becomes unknown, that is to say, the signal a may cause the second power domain 5 to be unstable, after the first power source 2 is powered down (i.e., the Vdd1 is in a low level state), however, because the first power domain 3 has been isolated from the second power domain 5 in advance, the influence of the unknown state of the signal a on the second power domain 5 will be reduced, so that the instability of the second power domain 5 that depends on the first power domain 3 can be reduced, and the purpose of reducing instability of the chip circuit when the first power domain 3 is switched off can be achieved.

It can be seen that, a core idea of implementing to switch off of the power domains according to the embodiment of the present disclosure is that: when the first power domain 3, on which the second power domain 5 depends, needs to be switched off, in the embodiment of the present disclosure, the isolation unit 6 of the second power domain 5 may firstly isolate the first power domain 3 from the second power domain 5, and then the first power domain 3 on which the second power domain 5 depends is switched off, so as to reduce instability of the chip circuit when the first power domain 3 is switched off; for example, the first power domain 3 and the second power domain 5 are any two timing-dependent power domains in the chip, and the second power domain 5 is dependent on the first power domain 3.

In order to implement the solution for switching off the power domain provided by the present disclosure, it is necessary to determine timing dependency between power domains, that is, there are some timing requirements on power control signals for the PMU1 to switch off the power domains; when the PMU switches off the power domains, the solution for switching off the power domains provided by the embodiment of the present disclosure should be implemented based on the timing dependency between the power domains; however, in a chip design process, analysis of the timing dependency is usually performed in a gate level stage of the chip, for example, the timing dependency between power domains is determined by standard delay format (SDF) gate level simulation; however, a circuit scale in the gate level stage is undoubtedly very complicated and huge, so it is undoubtedly very complicated to determine the timing dependency between the power domains by the SDF gate level simulation.

Optionally, the mainstream chip design is mainly divided into design processes such as specification, algorithm level description, register transfer level (RTL level) description, gate level netlist, and layout, the RTL level stage and the gate level stage are two key stages of chip design: in the RTL level, a chip function is described using a hardware description language (e.g., Verilog or VHDL), and the gate level (e.g., the gate level netlist) is obtained after the RTL level is logically synthesized; and in the gate level, the chip function is implemented with a specific logic unit (a dependency unit library), at this time, a timing relationship (including the timing dependency between the power domains as referred to in the embodiments of the present disclosure) is introduced in the gate level.

Correspondingly, the RTL level simulation and the gate level simulation are respectively simulation verification stages for the RTL level and the gate level; the RTL level simulation is to verify the syntax and basic functions (excluding timing information) of the chip function described in the hardware description language; the gate level simulation mainly performs simulation and verification on the timing in the gate level after logic synthesis; it can be seen that, although the gate level simulation may implement timing verification, the gate level is represented by specific logic units, and the circuit scale of the gate level is very complicated and huge, and therefore, it is undoubtedly very complicated to analyze the timing dependency between the power domains by SDF gate level simulation.

On this basis, in order to adapt to the solution for switching off the power domains provided by the embodiment of the present disclosure, an embodiment of the present disclosure provides a novel chip design method for determining timing dependency between power domains in a relatively simple manner, so that a PMU may implement the solution for switching off the power domains provided by the embodiment of the present disclosure according to the timing dependency between the power domains, and furthermore, it is possible to guarantee the stability of the circuit when the power domain in the designed chip needs to be switched off.

Figures 7, 8:
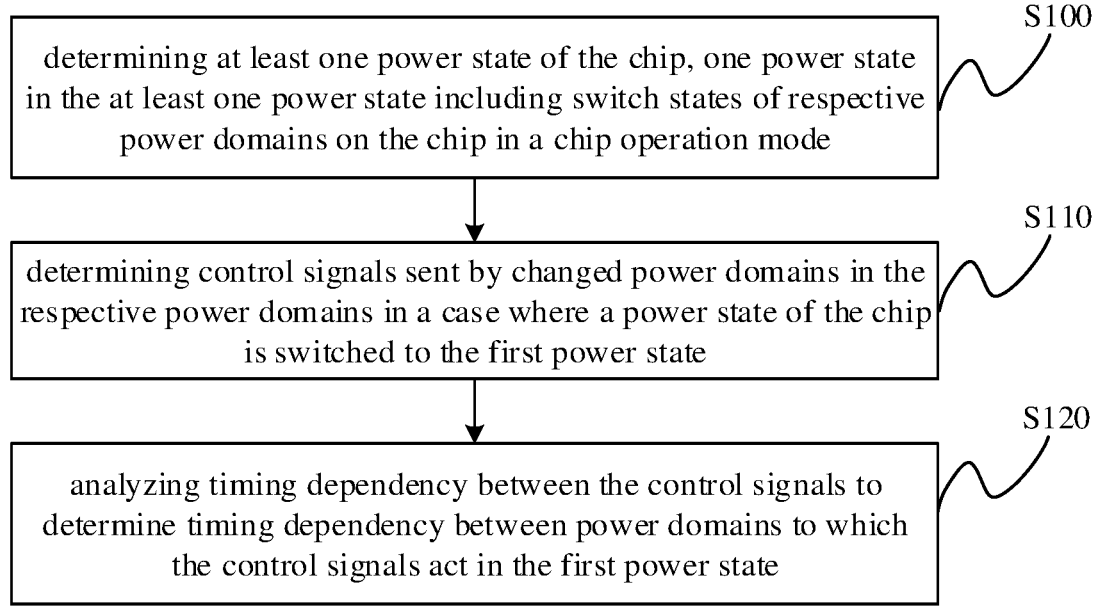
FIG. 7 is a flow chart of a chip design method provided by an embodiment of the present disclosure.
FIG. 8 is an exemplary diagram of power states provided by the embodiment of the present disclosure.

As an optional implementation mode of disclosed contents of the embodiment of the present disclosure, FIG. 7 shows an optional flow of the chip design method provided by the embodiment of the present disclosure, and the chip design method may be applicable to an RTL verification stage of chip design.

Optionally, in the embodiment of the present disclosure, a tool that implements the chip design method provided by the embodiment of the present disclosure may be configured in a chip design tool (for example, EDA), so that the chip design method provided by the embodiment of the present disclosure may be executed by the tool; and referring to FIG. 7, the chip design method may comprise:

Step S100: determining at least one power state of the chip, one power state in the at least one power state including switch states of respective power domains on the chip in a chip operation mode.

For example, the at least one power state includes a first power state.

Optionally, the chip may have a plurality of chip operation modes, such as power off, standby, and sleep; of course, the chip may also have other chip operation modes that are not shown and will not be described in detail here; in different chip operation modes, the switch states of the respective power domains on the chip are also different, for example, in the chip operation mode of power off, power sources corresponding to most power domains are powered down, so the most power domains are in an off state; in the chip operation mode of standby, power sources corresponding to some power domains are powered up while power sources corresponding to some other power domains are powered down, so that some power domains are in an on state and some other power domains are in an off state.

Exemplarily, taking a case that a Power Domain A (PDA) includes a Host Interface and CGC module, a Power Domain B (PDB) includes a Processor and Baseband Subsystem module, and a Power Domain C (PDC) includes an RF subsystem module as an example, FIG. 8 exemplarily shows an exemplary diagram of respective power states, and the respective power states may represent the switch states of the power domains in the respective chip operation modes.

It can be seen that, in the chip operation mode of power off, the switch states of the respective power domains may constitute a power state: on, off, off; in the chip operation mode of standby, the switch states of the respective power domains may constitute a power state: on, off, off; that is to say, with respect to any one chip operation mode, a set of the switch states of the respective power domains in the chip operation mode may be used as the power state in the chip operation mode; that is, a power state analyzed includes the switch states of the respective power domains in a chip operation mode.

Optionally, in the embodiment of the present disclosure, the switch states of the respective power domains in the respective chip operation modes may be respectively determined, so that the switch states of the respective power domains may be aggregated in the respective chip operation modes, respectively, to obtain the at least one power state of the chip.

Optionally, a switch state of a power domain in any one chip operation mode may be described by a United Power Format (UPF) file, and in the embodiment of the present disclosure, the switch states of the respective power domains in each chip operation mode may be determined according to the UPF file.

The UPF file is a standard power format file widely used for low-power design and verification in the IEEE1801 standard; and the UPF file consists of a group of commands similar to Tool Command Language, and is configured to describe low power intention in the chip design.

Exemplarily, the at least one power state of the chip may be obtained by analyzing the switch states of the respective power domains in the respective chip operation modes described in a power state table (PST) of the UPF file.

Step S110: determining control signals sent by changed power domains in the respective power domains in a case where a power state of the chip is switched to the first power state.

For example, the changed power domains may be part power domains on the chip, that is, the respective power domains include the changed power domains. When the power state of the chip is switched to the first power state, switch states of the changed power domains change.

After the at least one power state of the chip is determined, in the embodiment of the present disclosure, the power state of the chip may be switched between different power states, and during the switching process, power domains whose switch states change, i.e., the changed power domains, are determined, and the control signals sent to the power domains whose switch states change are analyzed, there may be a plurality of determined control signals; optionally, the first power state and a second power state may be set as two power states in the power states of the chip, that is, the at least one power state further includes the second power state; and in a case where the second power state is switched to the first power state, in the embodiment of the present disclosure, the power domains whose switch states change when the second power state is switched to the first power state may be determined, and control signals sent by the power domains whose switch states change are determined.

For example, in a case where a power state corresponding to the chip operation mode of standby is switched to a power state corresponding to the chip operation mode of sleep, the power domains whose switch states change when the power state corresponding to standby is switched to the power state corresponding to sleep may be analyzed, and the control signals sent by the power domains whose switch states change are analyzed.

Optionally, switching between power states referred to in step S110 should be legal switching between power states, that is, allowed switching between power states during the chip design.

For example, in some examples, the at least one power state further includes the second power state. Step S110 includes: determining switch states of the respective power domains in the second power state; determining switch states of the respective power domains in the first power state; determining the changed power domains in a case where the power state of the chip is switched from the second power state to the first power state, according to the switch states of the respective power domains in the second power state and the switch states of the respective power domains in the first power state; and determining the control signals sent by the changed power domains.

For example, in a case where a switch state (e.g., an on state) of a certain power domain in the second power state is different from a switch state (e.g., an off state) of the certain power domain in the first power state, the certain power domain is a changed power domain.

Step S120: analyzing timing dependency between the control signals to determine timing dependency between power domains to which the control signals act in the first power state (i.e., the power state that has been switched to).

Optionally, in the embodiment of the present disclosure, the timing dependency between the respective control signals may be analyzed by using a static timing analysis (STA) method, to determine the timing dependency between the power domains to which the respective control signals act in the power state switched to. It should be noted that, in the embodiment of the present disclosure, power domains to which each control signal acts include a power domain that sends the control signal and a power domain to which the control signal crosses.

In the embodiment of the present disclosure, the at least one power state of the chip may be determined in the RTL verification stage of chip design, one power state of the at least one power state includes switch states of the respective power domains on the chip in a chip operation mode; control signals sent by the power domains whose switch states change (i.e., the changed power domains) in a case where the power state is switched are determined; furthermore, timing dependency between respective control signals are analyzed to determine timing dependency between the power domains to which the respective control signals act in the power state switched to, so as to achieve to determine timing dependency between the power domains in respective power states. In the RTL verification stage of chip design, in the embodiment of the present disclosure, the timing dependency between the control signals sent by the power domains whose switch states change may be analyzed when the power state is switched, so that the timing dependency between the power domains is determined in the power state switched to, so as to achieve to determine the timing dependency between the power domains; in addition, in the embodiment of the present disclosure, the timing dependency between the power domains may be analyzed and determined in the RTL verification stage, instead of in a gate level stage of chip design; and therefore, the embodiment of the present disclosure may relatively easily implement to analyze and determine the timing dependency between the power domains.

Figure 9:
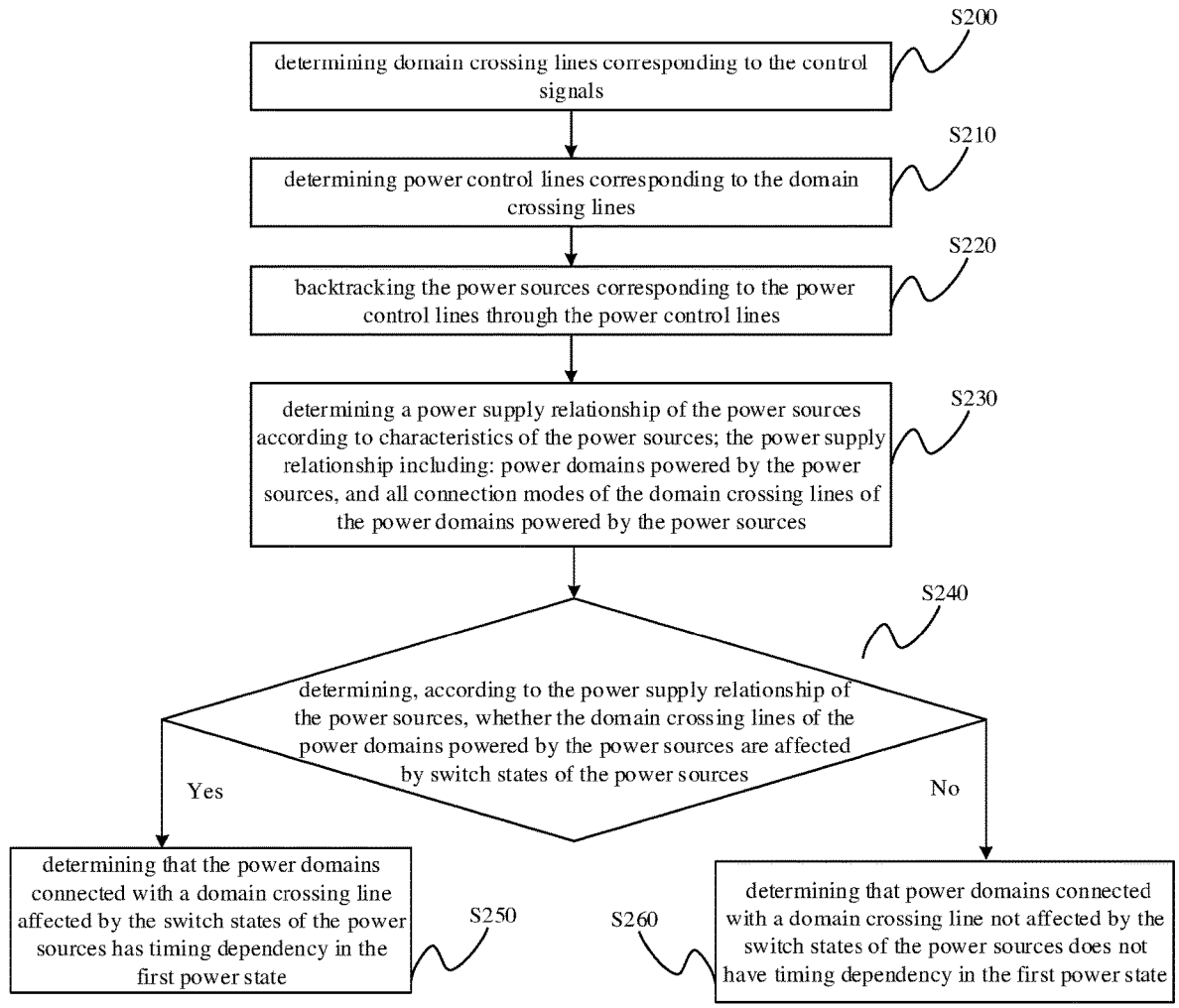
FIG. 9 is a flow chart of a method for implementing step S120 in a flow process shown in FIG. 7.

As an optional implementation mode, FIG. 9 shows a flow process of an optional implementation method of step S120 in the flow process shown in FIG. 7; and referring to FIG. 9, the flow process may include:

Step S200: determining domain crossing lines corresponding to the control signals.

In the embodiment of the present disclosure, domain crossing refers to a domain crossing line between power domains and indicates a control line for a control signal to cross from one power domain to another power domain; exemplarily, as shown in FIG. 5, a connection line between the first power domain and the second power domain may be considered as a domain crossing line.

As an optional implementation mode, in the embodiment of the present disclosure, after a control signal is determined, a domain crossing line between a power domain that sends the control signal and a power domain to which the control signal crosses may be determined.

Step S210: determining power control lines corresponding to the domain crossing lines.

After analyzing the domain crossing line, in the embodiment of the present disclosure, the power control line corresponding to the domain crossing line may be determined by combining a power state table and mode information of the PMU; and the power control line corresponding to the domain crossing line may be considered as a power control line of the power domain that outputs the control signal and is connected with the domain crossing line.

Step S220: backtracking the power sources corresponding to the power control lines through the power control lines.

According to the mode information of the PMU, in the embodiment of the present disclosure, the power source corresponding to the power control line may be determined.

Step S230: determining a power supply relationship of the power sources according to characteristics of the power sources; the power supply relationship including: power domains powered by the power sources, and all connection modes of the domain crossing lines of the power domains powered by the power sources.

Step S240: determining, according to the power supply relationship of the power sources, whether the domain crossing lines of the power domains powered by the power sources are affected by switch states of the power sources; if yes, proceed to perform step S250; if no, proceed to perform step S260.

Optionally, the switch state of the power source includes a power up state of the power source and a power down state of the power source. The domain crossing line of the power domain powered by the power source is affected by the switch state of the power source, which indicates that in a case where the power source changes between the power up state and the power down state, the control signal corresponding to the domain crossing line of the power domain powered by the power source will change.

Step S250: determining that the power domains connected with a domain crossing line affected by the switch states of the power sources has timing dependency in the first power state.

Optionally, the power domains connected with the domain crossing line includes a power domain connected with an input end of the domain crossing line and a power domain connected with an output end of the domain crossing line; and in the power domains connected with the domain crossing line affected by the switch states of the power sources, the control signal crosses from the power domain connected with the input end of the domain crossing line to the power domain connected with the output end of the domain crossing line.

Further, in a case where it is determined that the domain crossing line is affected by the switch states of the power sources, in the embodiment of the present disclosure, an isolation unit may be provided in the power domain connected with the output end of the domain crossing line, and the isolation unit may isolate the power domain connected with the input end of the domain crossing line from the power domain connected with the output end of the domain crossing line before the power domain connected with the input end of the domain crossing line is switched off, so as to implement the solution for switching off the power domains provided by the embodiment of the present disclosure; optionally, taking a case that the power domains connected with the domain crossing line affected by the switch states of the power sources are the first power domain and the second power domain, and the second power domain is dependent on the first power domain (i.e., the power domain connected with the input end of the domain crossing line is the first power domain, and the power domain connected with the output end of the domain crossing line is the second power domain) as an example, when the first power domain on which the second power domain depends needs to be switched off, in the embodiment of the present disclosure, the isolation unit may firstly isolate the first power domain from the second power domain, and then the first power domain on which the second power domain depends is switched off, thereby reducing instability of the chip circuit when the first power domain is switched off.

Step S260: determining that power domains connected with a domain crossing line not affected by the switch states of the power sources does not have timing dependency in the first power state.

Optionally, in the embodiment of the present disclosure, the power consumption intention in chip design described by the UPF file may cover aspects such as a power supply network, an isolation unit, and a power switch unit that are managed by the PMU. The UPF file may specify how to establish the power supply network, behaviors between respective power lines, and additional logic functions for supporting the design of dynamic power domain switch-off, etc.

Optionally, in the embodiment of the present disclosure, the UPF file may define a power domain; the UPF file may accurately describe power networks of the respective power domains according to power source distribution, and define a name of a power line of each power domain and a connection relationship between each power domain and an original power source input end of the chip in detail; in the design on power domain switch-off, the UPF file may define a power domain switch-off unit, and describe power domain input and power domain output of the power domain switch-off unit and a connection relationship of the control signal; and the power domain switch-off unit may be inserted in a physical implementation stage of the chip design.

A plurality of implementation schemes provided by the embodiments of the present disclosure are described above, in case of no conflict, respective alternative modes described in the respective implementation schemes may be combined with and cross-referenced to each other, thereby extending various possible implementation schemes, which may all be considered as the implementation schemes disclosed in the embodiments of the present disclosure.

Hereinafter, a chip design device provided by an embodiment of the present disclosure will be described; the chip design device described below may be considered as a functional module set by a chip design tool (for example, EDA) to implement the chip design method provided by the embodiment of the present disclosure. Contents of the chip design device described below and the contents of the chip design method described above may be cross-referenced.

Figure 10:
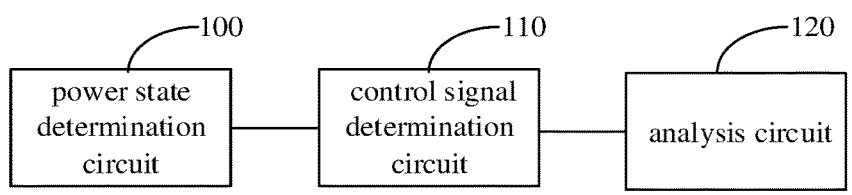
FIG. 10 is a block diagram of a chip design device provided by an embodiment of the present disclosure.

FIG. 10 is a block diagram of a chip design device provided by an embodiment of the present disclosure; and referring to FIG. 10, the chip design device may comprise:

A power state determination circuit 100, configured to determine at least one power state of a chip, one power state of the at least one power state including switch states of respective power domains on the chip in a chip operation mode, and the at least one power state including a first power state.

A control signal determination circuit 110, configured to determine control signals sent by changed power domains in the respective power domains in a case where the power state of the chip is switched to the first power state, in a case where the power state of the chip is switched to the first power state, the switch states of the changed power domains change.

An analysis circuit 120, configured to analyze timing dependency between control signals to determine timing dependency between power domains to which the control signals act in the first power state (i.e., the power state switched to).

Optionally, when the operation of determining at least one power state of a chip is executed, the power state determination circuit 100 is specifically configured to: analyze PST of a UPF file to determine the at least one power state of the chip; and PST describes switch states of the respective power domains on the chip in respective chip operation modes.

Optionally, when the operation of analyzing timing dependency between control signals to determine timing dependency between power domains to which the control signals act in the first power state is executed, the analysis circuit 120 is specifically configured to:

Determine domain crossing lines corresponding to the control signals;

Determine power control lines corresponding to the domain crossing lines;

Backtrack the power sources corresponding to the power control lines through the power control lines;

Determine a power supply relationship of the power sources according to characteristics of the power sources, in which the power supply relationship includes: power domains powered by the power sources, and a connection mode of the domain crossing lines of the power domains powered by the power sources.

Determine, according to the power supply relationship of the power sources, whether the domain crossing lines of the power domains powered by the power sources are affected by switch states of the power sources;

Determine that power domains connected with a domain crossing line affected by the switch states of the power sources has timing dependency in the first power state.

Optionally, when the operation of analyzing timing dependency between the control signals to determine the timing dependency between power domains to which the control signals act in the first power state is executed, the analysis circuit 120 may be further configured to:

Determine that the power domains connected with a domain crossing line not affected by the switch states of the power sources does not have timing dependency in the first power state.

Optionally, when the operation of determining the power control lines corresponding to the domain crossing lines is executed, the analysis circuit 120 is specifically configured to:

Determine the power control lines corresponding to the domain crossing lines according to the power state table and mode information of a PMU.

Optionally, when the operation of backtracking the power sources corresponding to the power control lines through the power control lines is executed, the analysis circuit 120 is specifically configured to:

Determine the power sources corresponding to the power control lines according to the mode information of the PMU.

Figure 11:
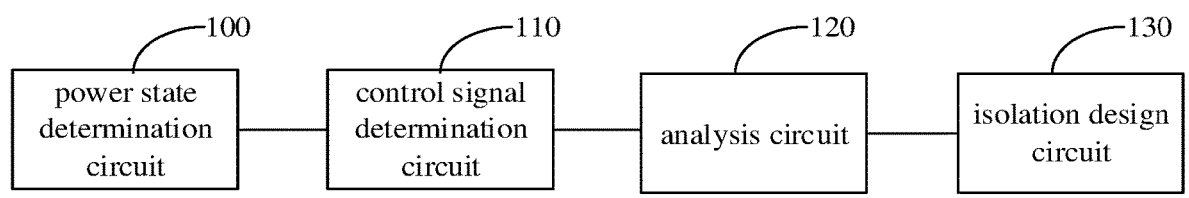
FIG. 11 is another block diagram of a chip design device provided by an embodiment of the present disclosure.

Optionally, FIG. 11 shows another block diagram of a chip design device provided by an embodiment of the present disclosure; and in combination with FIG. 10 and FIG. 11, the chip design device may further comprise:

An isolation design circuit 130, configured to design an isolation unit in a power domain connected with an output end of a domain crossing line, if the domain crossing line is affected by the switch states of the power sources. The isolation unit is configured to isolate a power domain connected with an input end of the domain crossing line from a power domain connected with the output end of the domain crossing line, before the power domain connected with the input end of the domain crossing line is switched off.

Optionally, in an optional implementation mode, the above-described chip design device may be a program module in a chip design tool (for example, EDA).

An embodiment of the present disclosure further provides an electronic device, and the electronic device may comprise the above-described chip shown in FIG. 5. That is, the electronic device may comprise a chip, and the chip comprise: a power management unit, configured to acquire timing dependency between a first power domain and a second power domain; a first power source and a second power source connected with the power management unit; a first power domain connected with the first power source, the first power source supplying power to the first power domain; a second power domain connected with the second power source, the second power source supplying power to the second power domain, the timing dependency indicating that the second power domain depends on the first power domain in timing in a current power state. The second power domain comprises an isolation unit, and the isolation unit is configured to isolate the first power domain from the second power domain before the first power domain is switched off.

For example, a first input end of the isolation unit is connected with a control line between the first power domain and the second power domain, and the control line is a domain crossing line that crosses from the first power domain to the second power domain; and a second input end of the isolation unit is connected with the power management unit.

For example, the power management unit is configured to: send, based on the timing dependency, an isolation signal to the isolation unit before sending a power down signal to the first power source to switch off the first power domain, so that the isolation unit isolates the control line between the first power domain and the second power domain; and send the power down signal to the first power source after the control line between the first power domain and the second power domain is isolated, to switch off the first power domain.

The electronic device may be a terminal device or a server device, and the electronic device may comprise the chip according to the embodiment of the present disclosure.

Although the embodiments of the present disclosure are disclosed as above, the present disclosure is not limited thereto. Any person skilled in the art can make various changes and modifications without departing from the spirit and scope of the present disclosure. Therefore, the protection scope of the present disclosure should be based on the protection scope defined by the claims.

What is claimed is:

1. A chip design method, applicable to a register transfer level verification stage of a chip, wherein the chip design method comprises:
   determining at least one power state of the chip, wherein one power state of the at least one power state comprises switch states of respective power domains on the chip in a chip operation mode, and the at least one power state comprises a first power state;
   determining control signals sent by changed power domains in the respective power domains in a case where a power state of the chip is switched to the first power state, wherein in a case where the power state of the chip is switched to the first power state, switch states of the changed power domains change; and
   analyzing timing dependency between the control signals to determine timing dependency between power domains to which the control signals act in the first power state.

2. The chip design method according to claim 1, wherein determining the at least one power state of the chip comprises:
   analyzing a power state table of a united power format file to determine the at least one power state of the chip, wherein the power state table describes the switch states of the respective power domains on the chip in each chip operation mode.

3. The chip design method according to claim 2, wherein analyzing the timing dependency between the control signals to determine the timing dependency between power domains to which the control signals act in the first power state comprises:
   determining power sources corresponding to the control signals;
   determining a power supply relationship of the power sources according to characteristics of the power sources, wherein the power supply relationship comprises: power domains powered by the power sources, and a connection mode of domain crossing lines of the power domains powered by the power sources;
   determining, according to the power supply relationship of the power sources, whether the domain crossing lines of the power domains powered by the power sources are affected by switch states of the power sources; and
   determining that power domains connected with a domain crossing line affected by the switch states of the power sources has timing dependency in the first power state.

4. The chip design method according to claim 3, further comprising:
   determining that power domains connected with a domain crossing line not affected by the switch states of the power sources does not have timing dependency in the first power state.

5. The chip design method according to claim 3, wherein determining the power sources corresponding to the control signals comprises:
   determining the domain crossing lines corresponding to the control signals;
   determining power control lines corresponding to the domain crossing lines; and
   backtracking the power sources corresponding to the power control lines through the power control lines.

6. The chip design method according to claim 5, wherein determining the power control lines corresponding to the domain crossing lines comprises:
   determining the power control lines corresponding to the domain crossing lines according to the power state table and mode information of a power management unit; and
   backtracking the power sources corresponding to the power control lines through the power control lines comprises:
   determining the power sources corresponding to the power control lines according to the mode information of the power management unit.

7. The chip design method according to claim 3, further comprising:
   in response to determine that a domain crossing line is affected by the switch states of the power sources, designing an isolation unit in a power domain connected with an output end of the domain crossing line, wherein the isolation unit is configured to isolate a power domain connected with an input end of the domain crossing line from the power domain connected with the output end of the domain crossing line, before the power domain connected with the input end of the domain crossing line is switched off.

8. The chip design method according to claim 1, wherein the at least one power state further comprises a second power state;
   determining the control signals sent by the changed power domains in the respective power domains in a case where the power state of the chip is switched to the first power state comprises:

determining switch states of the respective power domains in the second power state;

determining switch states of the respective power domains in the first power state;

determining the changed power domains in a case where the power state of the chip is switched from the second power state to the first power state, according to the switch states of the respective power domains in the second power state and the switch states of the respective power domains in the first power state; and determining the control signals sent by the changed power domains.

9. A chip design device, comprising:

a power state determination circuit, configured to determine at least one power state of a chip, wherein one power state of the at least one power state comprises switch states of respective power domains on the chip in a chip operation mode, and the at least one power state comprises a first power state;

a control signal determination circuit, configured to determine control signals sent by changed power domains in the respective power domains in a case where the power state of the chip is switched to the first power state, wherein in a case where the power state of the chip is switched to the first power state, switch states of the changed power domains change; and an analysis circuit, configured to analyze timing dependency between the control signals to determine timing dependency between power domains to which the control signals act in the first power state.

10. The chip design method according to claim 1, wherein analyzing the timing dependency between the control signals to determine the timing dependency between power domains to which the control signals act in the first power state comprises:

determining power sources corresponding to the control signals;

determining a power supply relationship of the power sources according to characteristics of the power sources, wherein the power supply relationship comprises: power domains powered by the power sources, and a connection mode of domain crossing lines of the power domains powered by the power sources;

determining, according to the power supply relationship of the power sources, whether the domain crossing lines of the power domains powered by the power sources are affected by switch states of the power sources; and determining that power domains connected with a domain crossing line affected by the switch states of the power sources has timing dependency in the first power state.

11. The chip design method according to claim 10, further comprising:

in response to determine that a domain crossing line is affected by the switch states of the power sources, designing an isolation unit in a power domain connected with an output end of the domain crossing line, wherein the isolation unit is configured to isolate a power domain connected with an input end of the domain crossing line from the power domain connected with the output end of the domain crossing line, before the power domain connected with the input end of the domain crossing line is switched off.

12. The chip design device according to claim 9, wherein in a case of performing an operation of analyzing the timing dependency between the control signals to determine the timing dependency between the power domains to which the control signals act in the first power state, the analysis circuit is configured to:

determine power sources corresponding to the control signals;

determine a power supply relationship of the power sources according to characteristics of the power sources, wherein the power supply relationship comprises: power domains powered by the power sources, and a connection mode of domain crossing lines of the power domains powered by the power sources;

determine, according to the power supply relationship of the power sources, whether the domain crossing lines of the power domains powered by the power sources are affected by switch states of the power sources; and determine that power domains connected with a domain crossing line affected by the switch states of the power sources has timing dependency in the first power state.

13. The chip design device according to claim 12, wherein the analysis circuit is further configured to:

determine that power domains connected with a domain crossing line not affected by the switch states of the power sources does not have timing dependency in the first power state.

14. The chip design device according to claim 12, further comprising an isolation design circuit, wherein the isolation design circuit is configured to, in response to determine that a domain crossing line is affected by the switch states of the power sources, design an isolation unit in a power domain connected with an output end of the domain crossing line, the isolation unit is configured to isolate a power domain connected with an input end of the domain crossing line from the power domain connected with the output end of the domain crossing line, before the power domain connected with the input end of the domain crossing line is switched off.

* * * * *